Patented Sept. 30, 1952

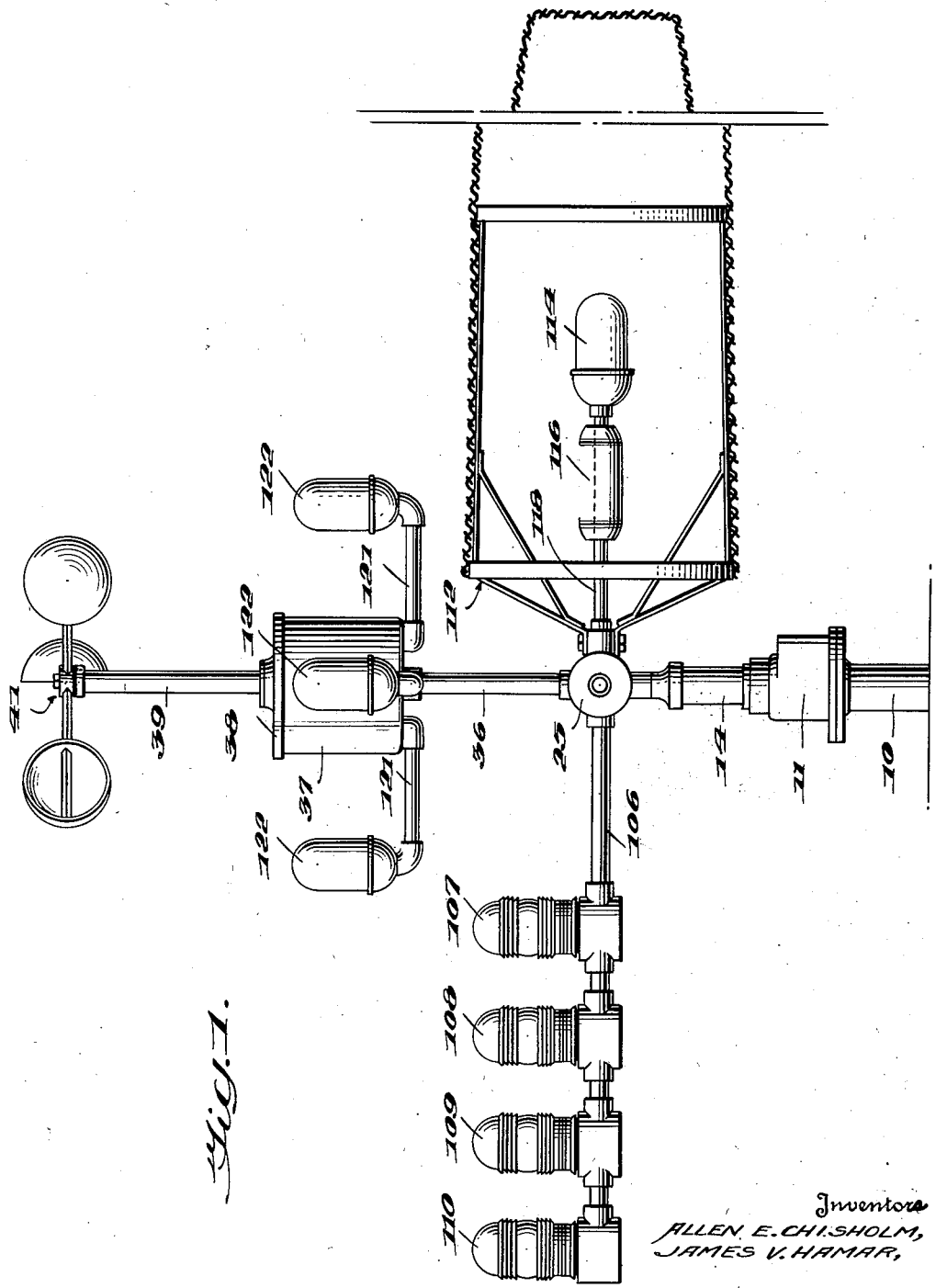

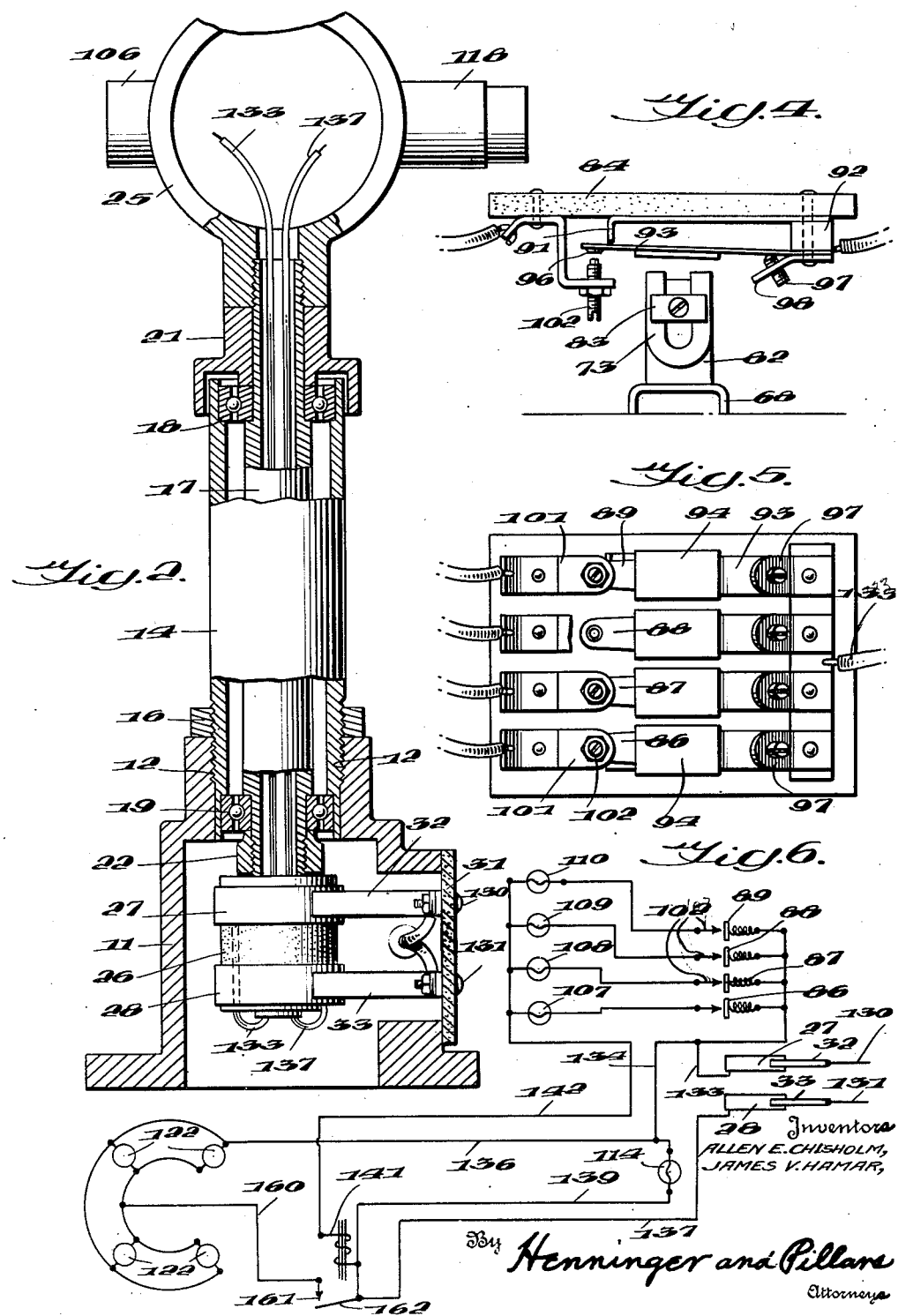

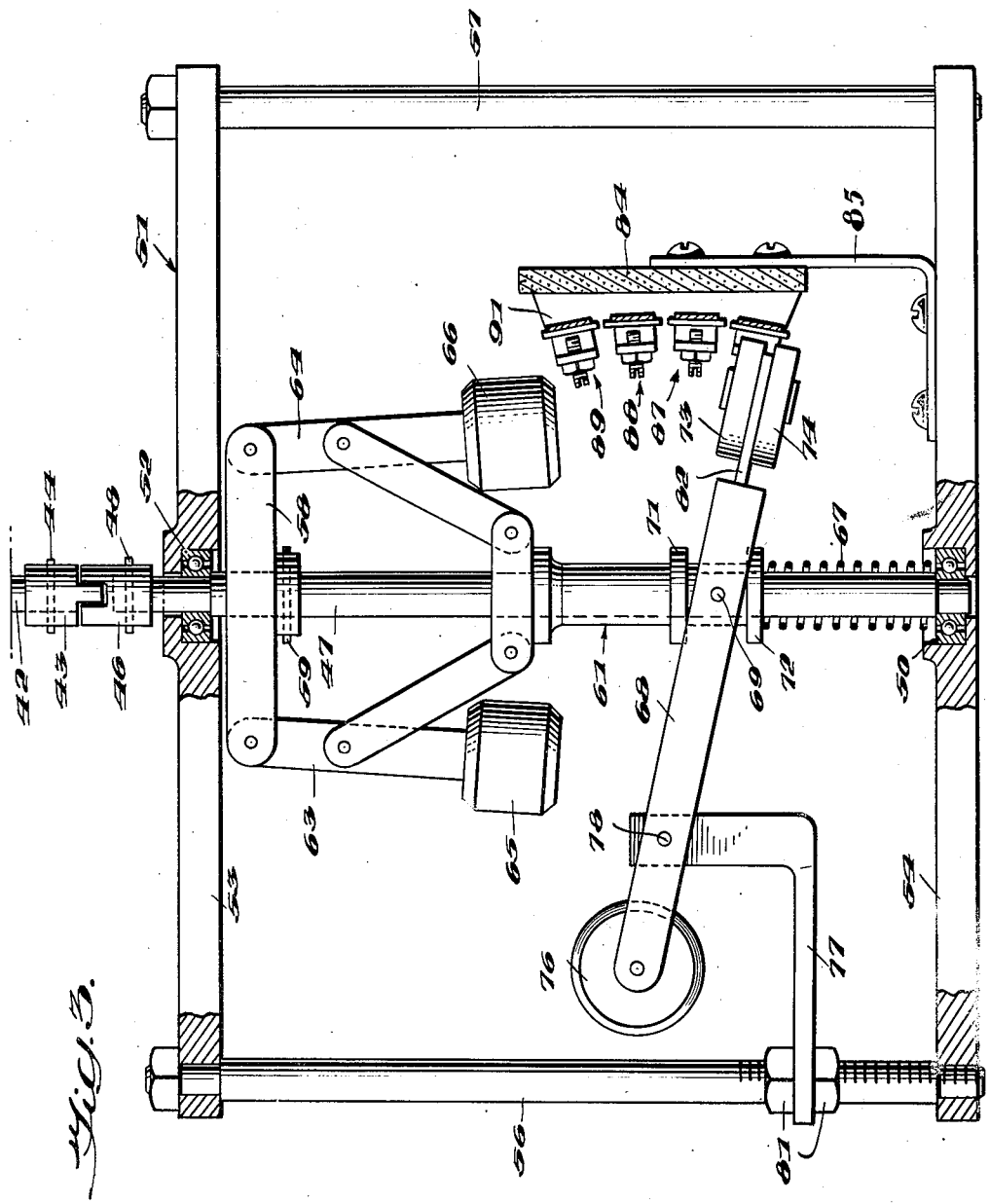

2,612,043

UNITED STATES PATENT OFFICE 2,612,043

WIND DIRECTION AND VELOCITY SIGNALING SYSTEM

Allen E. Chisholm and James V. Hamar, Portland, Oreg., said Hamar assignor to said Chisholm Application November 5, 1948, Serial No. 58,466

5 Claims. (Cl. 73—189)

The present invention relates to apparatus for providing an indication of the direction of air currents in the vicinity of an airport, and an indication of the velocity of such ground wind. The invention pertains to signalling means providing an indication of the direction and velocity of the wind during hours of darkness as well as during the day time.

The conventional wind sock employed by airports for indicating the direction of the wind fails to provide information regarding the velocity. Such means for indicating the direction of the wind does not provide the pilot of an aircraft with sufficient information for determining the velocity of the ground wind and thereby does not permit the pilot to make the necessary adjustments in the landing to safely and properly approach the airport or landing strip.

An object of the present invention is to provide means whereby airplanes, upon approaching a landing field, will be provided with a visible and an instantaneous indication of the ground wind and the direction and velocity of such air currents prevailing adjacent the landing field.

A further and more specific object of the invention is to provide indicating means for indicating the direction of air currents adjacent the landing strip or landing field, and indicating the velocity of such air currents, even when the wind is of a relatively low velocity.

Another object of the invention is to provide signalling means at an airport for indicating the direction of the air currents and the velocity, including means for indicating sudden changes in the velocity of the wind, such as brief and intermittent gusts.

A more detailed object of the invention is to provide signalling means for an airport for indicating the direction of the ground wind and the velocity thereof, including means to indicate failure of the velocity signalling means whereby the pilot may be made aware of the fact that the mechanism is not functioning properly to indicate the velocity of the air currents or changes in such velocity.

Other objects and features of the invention will be more apparent to those skilled in the art as the present disclosure proceeds and upon consideration of the accompanying drawings and the following detailed description wherein a typical embodiment of the invention is disclosed.

In the drawings:

Fig. 1 is a side elevational view of apparatus exhibiting the invention and showing the general organization.

Fig. 2 is a side elevational view partly in section of a bearing unit for supporting parts of the signalling mechanism.

Fig. 3 is an enlarged elevational view partly in section illustrating means for translating changes in the wind velocity to the signals.

Fig. 4 is a fragmentary plan view of the switch mechanism.

Fig. 5 is an elevational view of the contact mechanism forming a part of the velocity signalling means.

Fig. 6 is a circuit diagram illustrating the connections to the signalling elements.

Referring to the drawings, there is shown at 10 a mast of suitable height for supporting the signalling mechanism above the ground or an airport. The mast 10 is attached to a base member 11 as shown in Figs. 1 and 2, and this base is maintained in a fixed and non-rotatable position. The base member 11 is provided with a threaded opening 12 for receiving a threaded barrel 14 which extends upwardly from the base member 11 to any desirable height. The barrel 14 is preferably short and the necessary height is obtained by lengthening the mast 10. The barrel 14 may be maintained in a secure manner on the base 11 by means of a lock nut 16.

A tubular shaft 17 is mounted within the barrel 14 and is adapted for rotation therein. This shaft is of smaller diameter than the internal dimensions of the barrel 14 as shown in Fig. 2. The tubular shaft 17 is supported for rotation by means of a ball bearing assembly 18 mounted in the upper end of the barrel 14 and a second ball bearing assembly 19 arranged adjacent the lower end of the barrel 14. The upper end of the tubular shaft 17 is provided with a smaller diameter portion which extends through a dust cap 21. This cap is provided with a skirt which overhangs the bearing assembly 18 and accordingly prevents access of dust or other foreign matter to the interior of the barrel 14. The lower end of the tubular shaft is also of a reduced diameter and the inner race of the bearing 19 is maintained in operative association with the hollow shaft by means of a lock nut 22 threaded on the lower end of the shaft 17. The barrel 14 is counterbored at each end to receive the outer races of the bearing assemblies 18 and 19, and the shoulders provided by such counterboring serve as thrust stops for these bearing assemblies. When the upper end of the shaft 17 is threaded into a cross member 25 and the lock nut 22 is tightened against the bearing assembly 19, the bearings are then locked to the shaft 17 in such a manner that this shaft is free to rotate within the barrel 14. Any vertical thrust is opposed or restrained by the counterbores within the barrel 14.

A cylindrical shaped member 26 is mounted on the lower end of the hollow shaft 17, and this member is formed of insulating material. Two metal slip rings 27 and 28 are mounted on the insulating member 26, and this assembly is accordingly rotated during turning movements of the shaft 17. An insulating plate 31 is arranged on the base member 11 and may be detachably secured thereto in any suitable manner. This insulating plate 31 is provided for supporting two brushes 32 and 33. These brushes respectively engage the slip rings 27 and 28.

A tubular stem 36 extends upwardly from the cross member 25 and forms a support for a cylindrical housing 37. This housing is provided for enclosing a mechanism such as illustrated in Fig. 3, and which is hereinafter described in detail. The tubular stem 36 also forms a conduit for conductors which form a part of the electrical connections between elements of the signalling mechanism as described below. The housing 37 is provided with a removable top plate or cover 38 which supports a tubular member 39 and which forms a part of a conventional anemometer cup head 41. The lower end of the shaft driven by the anemometer cup head is illustrated at 42 in Fig. 3. This shaft 42 carries a coupling member 43. The coupling 43 is secured to the shaft 42 by means of a pin 44. The coupling member 43 is provided with a tongue which extends into a groove in a complementary coupling member 46. The coupling member 46 is attached to a vertical shaft 47 by means of a pin 48. The shaft 47 is journaled for rotation in a frame member indicated generally at 51 by means of ball bearing assemblies 50 and 52. The shaft 47 is accordingly driven by the anemometer head 41 and at a speed corresponding to the velocity of the wind.

The frame 51 and the parts associated therewith are adapted to be mounted within the housing 37. The frame 51 includes an upper bar 53 and a lower bar 54. These bar elements of the frame are connected by vertically arranged rods or bolts 56 and 57. A governor is mounted on the shaft 47 and the bar 58 thereof is secured to the shaft 47 by means of a collar and pin assembly indicated at 59. The upper component of the governor is thereby fixed to the shaft 47. The lower component of the governor is indicated at 61 and is slidable on the shaft 47. This portion of the governor includes a tubular member for attachment of the switch actuating mechanism hereinafter described. The governor differs from a conventional governor in that the top cross bar 58 is of sufficient length measured horizontally so that the fulcrum pins supporting the links 63 and 64 are so arranged that these members will hang in substantially vertical positions when the shaft 47 is not rotating. The inertia weights 65 and 66 are illustrated in the inoperative position in Fig. 3. This construction provides for extreme sensitivity at low rotational speeds of the shaft 47 and accordingly provides a more accurate indication of the low wind velocities.

The upper end of the shaft 47 is provided with a reduced diameter portion which fits the inner race of the ball bearing assembly 52. The outer race of this ball bearing is supported by the frame member 53. The lower end of the shaft 47 is provided with a similar reduced diameter portion which fits the inner race of the ball bearing assembly 50 mounted in the cross member 54. Accordingly, the weight of the shaft 47 and the governor elements is supported by the bearing 50.

A helical shaped spring 67 surrounds the lower end of the shaft 47 and bears at one end against the tubular member forming a lower portion of the governor. The opposite end of the spring 67 engages the inner race of the bearing 50. This spring 67 is at a maximum compression when the governor and the shaft 47 are at rest. A minimum compression of this spring 67 is attained when the tubular portion 61 of the governor has moved upwardly from the inoperative position shown in Fig. 3 for a distance approximating one-third of its vertical movement on the shaft 47. The purpose of this spring 67 is to provide increased sensitivity of the governor for counteracting any frictional resistance encountered in the governor mechanism in starting and during low speed rotation such as prevails when the wind velocity is low.

A yoke 68 is fulcrumed or pivotally mounted on the governor and is accordingly moved with movement of the tubular member 61 of the governor. Rollers (not shown) may be provided on the yoke 68 engaging between the flanges 71 and 72 carried by the member 61. These rollers may be attached to the yoke 68 by means of stub shafts 69. The yoke member 68 is U-shaped and the closed end portion thereof is shown in Fig. 4. This closed end portion of the yoke carries a plurality of magnets 73 and 74 as shown in Figs. 3 and 4. These magnets may be of the permanent magnet type and U-shaped as shown in Fig. 4. The opposite end of the yoke member 68 supports a counterweight 76 which is mounted between the free ends of a U-shaped yoke member 68. The parallel legs of the yoke 68 straddle a bracket 77 which is mounted on the bar or bolt 56. A pivot pin 78 extends through the two legs of the yoke member 68 and through an opening in the bracket 77. The position of the bracket 77 may be adjusted on the bolt 56 by means of lock nuts 81 so that the position of the pivot pin 78 may be adjusted. This adjustment of the pivot point of the yoke member 68 permits adjustment of the magnets 73 and 74 relative to the switch members hereinafter described. The counterweight 76 is preferably of sufficient mass to exactly balance the weight of the yoke to the right of the pivot point 78 whereby the governor mechanism is not called upon to carry an unbalanced condition of the yoke assembly. The magnets 73 and 74 are clamped to an extension 82 which extends from the yoke member and magnets may be attached thereto by means of a screw and clamp members 83.

A plate 84 formed of insulating material is supported on the frame member 54 by means of a bracket 85. A plurality of electrical switches are mounted on the insulating plate 84 and these switches are indicated at 86, 87, 88 and 89. These switches are all mounted adjacent a stop plate 91 having an edge thereof curved to a radius centering at the pivot point 78. A similarly curved support 92 is provided for supporting one end of the switch fingers 93. Each switch finger carries an armature 94 and the free end of each of the switch fingers carries a contact element 96. The resilience of each switch finger may be varied by means of a screw 97 which is threaded through a bracket 98 carried by the support 92. A plurality of bracket 101 are mounted on the insulating plate 84 and support adjusting screws 102 which provide the other part of the contact elements. The screws 97 are adjusted to lightly tension the free end of the switch fingers 93 against the curved stop plate 91. The screws 102 are adjusted so as to regulate the maximum movement of the free end of the switch fingers 93. The curved extension of the stop plate 91 regulates the movement of the switch fingers in the opposite direction.

Reverting to Fig. 1, there is shown at 106, an arm supporting a plurality of lighting fixtures 107, 108, 109 and 110. The arm 106 is preferably hollow so as to form a conduit for the electrical conductors extending to these fixtures. Extending in an opposite direction from cross member 25 is a frame 112 for supporting a conventional type wind sock. This frame includes a conduit 118 extending into the interior of the cross member 25 and this conduit is adapted to provide means for encasing electrical wires extending to electric light fixture 114. This lighting fixture is adapted to illuminate the interior of the wind sock and to provide an indication of the wind even in hours of darkness. A counterweight 116 is carried by the conduit 118. The signalling device also includes a plurality, in this case four, tubular arms 121 which are in open communication with the housing 37 and supported thereby. These tubular arms 121 provide conduits and supports for electrical lighting fixtures 122.

The electrical circuit for the signalling apparatus is shown in Fig. 6. A source of energy is supplied to the conductors 130, 131 and these conductors are connected to the brushes 32 and 33. A conductor 133 extends from the slip ring 27 to all of the switch fingers of the switches 86, 87, 88 and 89. Another branch conductor 134 extends from the wire 133 to one side of the lamp 114. A further branch wire 136 extends to one side of the lamps 122. Accordingly, potential from one side of the line is supplied to the fingers of the switches 86, 87, 88 and 89 and to one side of the lamp 114 and to one side of the lamp 122.

A conductor 137 is connected to the other slip ring 28 and is connected through a wire 139 to the other side of the lamp 114. A relay coil 141 is also connected to the conductor 139 and the other side of the lamp 114. A relay coil 141 is also connected to the conductor 139 and the other side of this coil is connected by means of a wire 142 to one side of the lamps 107, 108, 109 and 110. A plurality of conductors extend from the opposite side of the lamps 107, 108, 109 and 110 to the fixed contacts 102 of the switch fingers. A conductor 160 extends from the opposite sides of the lamps 122 to a contact 161. This contact is engaged by a switch arm 162 when the relay coil 141 is energized. The conductors extending from the slip ring 27 and 28 to the various signal lamps and the relay 141 are all housed within the hollow shaft 17 and the tubular conduits which form supporting elements for the various parts of the apparatus.

In operation, the cross member 25, and all of the elements supported thereby, rotates freely on the bearings 18 and 19. The air current passing through the wind sock attached to the frame 112 causes this wind sock to distend leewardly, thus rotating the cross member 25 and pointing the fixtures on the arm 106 windwardly. Such air current simultaneously rotate the anemometer head 41 thus driving the shaft 42 and the shaft 47 actuating the governor. As the shaft 47 rotates the weights 65 and 66 swing outwardly to raise the sliding tubular member 61 on the shaft 47. Such upward movement of the sliding component of the governor raises the yoke member 68 and causes the yoke member to turn about the axis of the pin 78. The magnets 73 and 74, therefore, move upwardly but are still spaced a uniform distance from the stop plate 91. The flux produced by the poles of the magnets permeates an armature 94 of a switch finger 93 in proportion to the relative position and distance between the magnet and a particular armature. The force exerted by this flux on the armatures 94 is resisted by the resilient structure of the switch fingers proportionate to the tension imposed on such fingers by the screws 97. Thus if any one armature is positioned in the path of maximum flux then the magnetic pull on such armature is at a maximum. The fingers 93 are constructed of resilient material and these switches return to the inoperative position when the flux is no longer sufficient to bias the fingers to a switch closing position. It is to be noted that the magnets 73 and 74 provide an overlap between the adjacent armatures 94 whereby two armatures may be attracted simultaneously and one of the armatures is at all times attracted to maintain one of the switch fingers in a closed position.

The actuation of one of the fingers 93 closing the switch 86, for example, completes a circuit from the slip ring 27 through the conductor 133 and the lamp 107 and the conductor 142, the relay coil 141 and the conductor 137 to the other side of the line through the slip ring 28. This causes the lamp 107 to be energized and also causes the relay switch arm 162 to engage the contact 161. Accordingly, another circuit is completed through the conductor 134, the branch wire 136, the lamps 122 and the conductor 160 and the wire 137 to the other side of the line whereby the lamps 122 are energized. The lamp 114 is also energized to illuminate the wind sock.

If it is calm or when the velocity of the wind is low, the switch 86 will be closed since the armature 94 carried by the lowermost switch finger 93 will be in the path of the maximum flux. Accordingly, the lamp 107 will be energized and this lamp may be enclosed in a green color casing which will glow in connection with the uncolored lights 122, thus indicating substantially no velocity of the wind. If a slight breeze exists or develops, amounting to five miles an hour, for example, the magnets 73 and 74 will move slightly upward because of the increased speed in the rotation of the shaft 47. These magnets will then be in a position to exert sufficient magnetic force to close the finger of the switch 87 without releasing the finger of the switch 86. Such closure of the switch 87 will illuminate the light 108 which may be, for example, colored yellow. This combination of colors will then provide an indication that the ground wind has a velocity of approximately five miles per hour.

An increase in the velocity of the air current adjacent the airport to ten miles an hour, for example, will cause the magnets 73 and 74 to move upwardly so as decrease the flux sufficiently on the lowermost armature to permit the switch finger of the switch 86 to return to an open position whereby the lamp 107 will be de-energized. Thus the fixture 108 will remain illuminated, indicating a velocity of approximately ten miles per hour. A further increase in the velocity of the ground wind will cause the magnets 73 and 74 to move further upwardly, creating a further combination of colors which will prevail in sequence, and with an inverse sequence at diminishing wind velocities. The colors that have been chosen, but which may be varied, and which appear to be readily visible from considerable height are that the lamp 107 is green, the lamp 108 is yellow, lamp 109 is blue and lamp 110 is red. Other colors and sequence of colors may be employed without departing from the spirit and scope of the invention.

If any of the lamps of the velocity indicating means should burn out, or any of the circuits leading thereto become open, the circuit to relay winding 141 will thereby be opened. Such deenergization of the relay winding will permit the switch arm 162 to move to an open position so that the lamps 122 will be de-energized thereby indicating that the wind velocity indications are to be disregarded. It is to be noted that the sequence of operation is such that the lamps 122 will be extinguished only when an open circuit condition prevails in connection with the switches 86, 87, 88 and 89.

The foregoing description of invention represents one manner in which the principles may be employed in practice, but the structural features may be varied in a number of respects. The position of the various elements may be arranged in any manner, and additional lamps may be employed as wind velocity indicating means. Various other modifications may be made without departing from the spirit and scope of the invention as set forth in the appended claims.

We claim:

1. In apparatus for indicating the direction and velocity of air currents over an airport, a rotatable member, a horizontal arm carried by said member, a plurality of signal lamps on said arm, a wind sock frame carried by said member arranged in a direction opposite said arm, a circuit containing a switch for each of said lamps, a governor driven by air currents passing over the airport, magnetic means moved by said governor to selectively actuate said switches for controlling the illumination of said lamps in accordance with the velocity of the wind, and means in said circuit for indicating the failure of a circuit to said lamps.

2. In an airport signalling device, a member rotatable about a vertical axis, a horizontal arm carried by said member, a plurality of lamps on said arm, a wind sock frame carried by said cross member, a plurality of switches for completing circuits to said lamps, a governor mechanism driven in response to the velocity of the wind, magnetic means actuated by said governor for closing switches, and a housing carried by said member encasing said governor and said switches.

3. In a system for visually signaling the direction and velocity of air currents to airborne craft, the combination comprising a member rotatable about a vertical axis, a horizontal arm supported by said member, a plurality of signal lamps supported upon said arm and positioned adjacent to one end thereof and means located adjacent to the opposite end of said arm to position the arm in the direction of air current flow, a circuit for energizing said signal lamps comprising a separate switch for each of said lamps, switch actuating means comprising a member movable in accordance with the velocity of said air currents for simultaneously closing not more than two of said switches, a pilot lamp supported on said member and energized from said circuit, and means for deenergizing said pilot lamp upon cessation of illumination of said signal lamps.

4. In an airport signaling device, a member rotatable about a vertical axis, a horizontal arm carried by said member, a plurality of lamps on said arm, means responsive to wind direction for rotating said member, a governor mechanism driven in response to the velocity of the wind, a magnet pivotally connected to said governor, a plurality of magnetic switches positioned in the orbital pivotal path of said magnet, and electrical connections between said switches and said lamps for sequentially actuating said lamps in response to said governor.

5. In a system for visually signaling the direction and velocity of air currents to airborne craft, the combination comprising a member rotatable about a vertical axis, a horizontal arm supported by said member, a plurality of signal lamps supported upon said arm and positioned adjacent to one end thereof and means located adjacent to the opposite end of said arm to position the arm in the direction of air current flow, a governor having a shaft whose vertical position is responsive to the velocity of air currents, a magnetic switch actuator pivotally connected to said shaft and rotated thereby, a circuit for energizing said signal lamps comprising a separate switch for each of said lamps, said switches being positioned in line adjacent the orbital path of one end of said switch actuator, said switches and switch actuator being so positioned relative to one another as to produce sequential actuation of said switches and simultaneous closing of not more than two thereof.

ALLEN E. CHISHOLM.
JAMES V. HAMAR.

REFERENCES CITED

The following references are of record in the file of this patent:

UNITED STATES PATENTS

| Number | Name | Date |
|---|---|---|
| 1,475,075 | Macy | Nov. 20, 1923 |
| 1,496,486 | Pedu | June 3, 1924 |
| 1,913,672 | Huking | June 13, 1933 |
| 1,953,159 | Eskilson et al. | Apr. 3, 1934 |
| 2,172,903 | Charping | Sept. 12, 1939 |
| 2,236,429 | Hipsley | Mar. 25, 1941 |
| 2,435,106 | Stilwell | Jan. 27, 1948 |